United States Patent [19]
Dahlstrom

[11] Patent Number: 5,862,899
[45] Date of Patent: Jan. 26, 1999

[54] BRAKE-SHIFT INTERLOCK

[75] Inventor: Jonathan Dahlstrom, Highland, Mich.

[73] Assignee: UT Automotive Dearborn, Inc., Dearborn, Mich.

[21] Appl. No.: 814,774

[22] Filed: Mar. 10, 1997

[51] Int. Cl.$^6$ ................................................. B60K 41/26
[52] U.S. Cl. .......................... 192/4 A; 74/483 R; 477/96
[58] Field of Search ......................... 192/4 A; 74/483 R; 477/96

[56] References Cited

U.S. PATENT DOCUMENTS

| | | |
|---|---|---|
| 3,870,120 | 3/1975 | Blinkilde . |
| 4,887,702 | 12/1989 | Ratke et al. . |
| 4,926,688 | 5/1990 | Murasaki . |
| 4,938,042 | 7/1990 | Muramatsu ........................... 477/96 X |
| 4,942,937 | 7/1990 | Amberger et al. . |
| 5,027,929 | 7/1991 | Ratke et al. . |
| 5,027,931 | 7/1991 | Ratke et al. . |
| 5,036,962 | 8/1991 | Amagasa . |
| 5,078,242 | 1/1992 | Ratke et al. . |
| 5,127,245 | 7/1992 | Imai et al. ............................. 477/96 X |
| 5,211,271 | 5/1993 | Osborn et al. ........................... 192/4 A |
| 5,251,723 | 10/1993 | Rolinski et al. . |
| 5,314,049 | 5/1994 | Nordstrom . |
| 5,494,141 | 2/1996 | Osborn et al. . |

FOREIGN PATENT DOCUMENTS

| | | |
|---|---|---|
| 0 468 152 | 1/1992 | European Pat. Off. . |
| 0 655 570 | 5/1995 | European Pat. Off. . |
| 0 754 887 | 1/1997 | European Pat. Off. . |
| 0 785 380 | 7/1997 | European Pat. Off. . |

OTHER PUBLICATIONS

Patent Abstracts of Japan, vol. 013, No. 360 (M–858), Aug. 11, 1989, & JP 01119425A (Toyota Motor Corp; Others:01), May 11, 1989.
Patent Abstracts of Japan, vol. 095, No. 004, May 31, 1995, & JP 07019334A (Kuroishi Tekko KK), Jan. 20, 1995.

*Primary Examiner*—Richard M. Lorence

[57] ABSTRACT

A transmission shift lever interlock comprises a locking cam and a latch. The locking cam engages the shift lever as it is moved to or from the park position. A bias spring normally moves the latch into engagement with the cam when the shift lever is moved from the park position to prevent movement of the cam to lock the shift lever. The latch is held out of engagement with the cam, however, by a holding solenoid when the brakes are applied. The cam is able to rotate and allow the shift lever to be moved to the park position regardless of whether the solenoid is energized.

18 Claims, 2 Drawing Sheets

BRAKE-SHIFT INTERLOCK

TECHNICAL FIELD

This invention relates to the art of interlock mechanisms. In particular, the invention relates to an interlock for controlling the operation of a shift mechanism of an automobile transmission.

BACKGROUND ART

Interlock mechanisms for controlling the operation of the shift lever of an automobile transmission are known. In general, these mechanisms are utilized to prevent movement of the shift lever from a given position until certain prescribed conditions are met. For example, it is usually desirable for the interlock mechanism to prevent shifting an automatic transmission from the park position when the engine is running unless the driver has applied the brakes.

One prior interlock utilizes a solenoid for controlling a latch, which engages a movable part of the shift mechanism in the form of a bar. The latch captures the bar when in the locked position and releases the bar when in the unlocked position. The logic of this arrangement is that the solenoid holds the latch in the locked position when the solenoid is energized and allows the latch to be moved from the locked position when the solenoid is not energized. Thus, in that system, the transmission is prevented from shifting from the park position only when the ignition is on and the solenoid energized.

Other known interlock mechanisms use a solenoid to hold a lock member in the locked position when the solenoid is energized.

These prior interlock mechanisms are mechanically complicated and require the solenoid to be energized to activate the interlock. This means that the interlock only works when the ignition is on and that the solenoid is always energized when the ignition is on and the brakes not applied. Constant energization of the solenoid places additional physical demands on the solenoid itself and requires a continuous supply of electric current. The requirement for a continuous supply of current is a particular disadvantage in electric cars. It is possible to employ an electronic circuit that senses when the transmission has been shifted out of the park position to deactivate the solenoid, but these systems are more complicated and require an additional element to sense when the transmission is not in "park". These park sensing system have also been used to eliminate the clicking sound of the solenoid heard by the driver as the brakes are activated or released.

Interlocks are also known that operate when the ignition is off. These systems, however, have required separate mechanical elements such as a slide mechanism.

SUMMARY OF THE INVENTION

An interlock mechanism in accordance with the invention is particularly designed for use with a floor shift lever of an automobile transmission even though it may be used to advantage in other mechanisms, including transmission shift mechanism of other types. The interlock includes a locking element that engages the push rod portion of a shift lever, or other element that moves with the shift lever, when the transmission is shifted to or from a particular position, such as the park position. The locking element is preferably a cam with a lobe portion for engaging the push rod. The cam is pivotally mounted such that the push rod engages the cam during shifting and is allowed to move to or from the park position only by rotating the cam.

A latch includes a hook that engages a notch in the cam. The latch is mounted adjacent the cam such that it selectively prevents rotation of the cam in one direction but always allows rotation of the cam in the opposite direction. The latch is biased into engagement with the cam by a spring. Thus, unless the latch is positively disengaged, the latch will prevent rotation of the cam, and engagement between the lobe and the push rod will prevent movement of the shift lever. Thus the transmission will not shift from the park position unless the latch is positively disengaged.

Disengagement of the latch from the cam is controlled by a solenoid, which is, in turn, controlled by an electric circuit. The electric circuit is energized when the ignition switch is on and includes a switch activated by application of the automobile's brakes. The system is arranged so that when the ignition is on and the brakes are applied, the solenoid will be activated to hold the plunger against the latch and maintain it in the disengaged position. The transmission may then be shifted from the park position. If the brakes are not applied, the latch will be pressed into engagement with the cam by the bias spring, and the transmission will be locked in the park position. If the ignition is off, the electric circuit will not be energized, and the latch will similarly prevent movement of the shift lever from the park position. The cam will allow shifting to the park position, however, whether the brakes are applied or the ignition is on.

The results of the various possible positions of the brakes and the ignition are summarized in the following table.

| Ignition switch | Application of Brakes | Shift from park? | Shift to park? |
| --- | --- | --- | --- |
| Off | On | No | Yes |
| Off | Off | No | Yes |
| On | On | Yes | Yes |
| On | Off | No | Yes |

In the preferred embodiment, the solenoid is spring-biased toward the engaged position, whereby the plunger is always in contact with the latch. If the cam is rotated when the solenoid is not activated by attempted movement of the shift lever, the latch will be moved against the plunger as it engages the notch in the cam. When the solenoid is activated, this movement will be prevented, and the cam will be allowed to rotate.

It is an object of this invention to provide an interlock for a transmission that employs a cam and a locking latch.

A further object of the invention is to provide an interlock for a transmission where a control solenoid is energized to prevent locking only when the brakes are applied.

Yet another object of the invention is to provide an interlock mechanism that does not use self-moving parts and does not require a park-sensing element.

DETAILED DESCRIPTION OF THE PREFERRED EMBODIMENT

Figure 1:
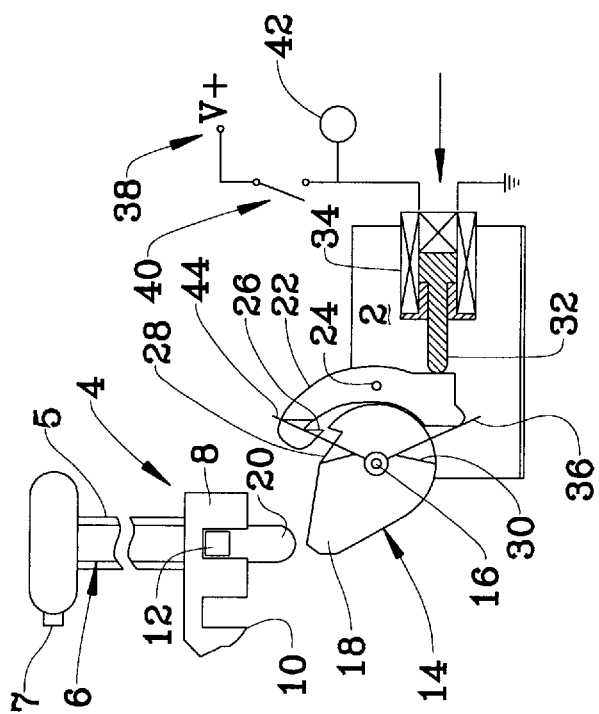
FIG. 1 is a schematic drawing of a preferred form of a transmission interlock in accordance with the invention, when the transmission is in park, the ignition is on, and the brakes not applied.

FIGS. 1 through 5 illustrate the operation of a preferred embodiment of the invention. With reference to FIG. 1, a transmission interlock mechanism 2 is designed to operate with a transmission shift structure 4. The transmission shift structure includes a transmission shift lever 5 having a push rod 6 that is operated by a push button 7 as is known in the art. The shift structure further includes a locking plate 8 having detents 10. The push rod includes a bar 12 that engages the detents 10 to retain the push rod and, hence, the shift lever, in a selected position. It will be appreciated that the transmission shift structure 4 is shown schematically for illustrating the invention but that a variety of known shift structures may be used.

The shift structure is arranged in operative relationship with the interlock 2 such that the interlock controls movement of the shift lever. The interlock 2 comprises a lock element 14, preferably a cam, that is pivotally mounted at a pivot connection 16. The cam includes a lobe portion 18 that is positioned to engage the tip 20 of the push rod when the shift mechanism is moved to or from the park position. Thus, movement of the push rod 6 downward to disengage the bar 12 from a detent 10, such as a detent associated with the park position of the shift mechanism, brings the tip 20 into engagement with the lobe portion 18. The dimensions of the cam, detent, and push rod are such that the bar cannot be disengaged from the detent without rotation of the cam 14. The cam, thus, controls the movement of the shift mechanism.

The rotation of the cam, in turn, is controlled by a latch 22. This latch is mounted adjacent the cam for pivotal motion about a mounting pin 24. The latch includes a tooth 26 for engaging a notch 28 in the cam 14 when the latch is pressed against the cam. When the tooth is so engaged, the latch prevents further rotation of the cam in the counterclockwise direction. The cam may, however, rotate in the clockwise direction. If the latch is prevented from engagement with the cam, as when the latch is held in the position shown in FIG. 1, the cam is free to rotate in either direction.

The engagement between the latch and the cam is controlled by a biasing leaf spring 30 and a release mechanism comprising a plunger 32 held by a solenoid 34. The leaf spring 30 is connected for rotation with the cam, and a tip 36 of the spring engages the latch below the pivot point 24. The spring 30 urges the latch into engagement with the cam as the cam rotates counterclockwise unless the solenoid prevents such as will be explained below.

The solenoid 34 is arranged such that the plunger 32 is always in contact with the lower part of the latch. That is, the solenoid includes an internal bias spring (not illustrated) that urges the plunger outward to the engaged position of the solenoid. The solenoid is part of an electric circuit of the automobile that includes a source of voltage, such as a battery terminal 38, a brake switch 40 that is closed upon application of the brakes, and brake lights 42. When the brakes are applied, the solenoid 34 is energized, and the plunger 32 is thereby magnetically held in place at the seal face end of the solenoid and engaged against the bottom of the latch 22 to prevent its rotation counterclockwise.

The latch is urged to rotate clockwise by a second leaf spring 44, which is attached to the cam similarly to the leaf spring 30. Thus, when the cam 14 rotates clockwise, a tip of the leaf spring 44 engages the latch above the pivot 24 and tends to rotate the latch clockwise to the position shown in FIG. 1.

The operation of the preferred embodiment of the latching mechanism will now be described.

FIG. 1 illustrates the situation when the brakes have not been applied, and the transmission shift mechanism is in the park position. In this condition neither the push rod nor the latch is engaged with the cam. The plunger 32 is in contact with the bottom of the latch and seal face end of the solenoid by operation of an internal bias spring.

Figure 2:
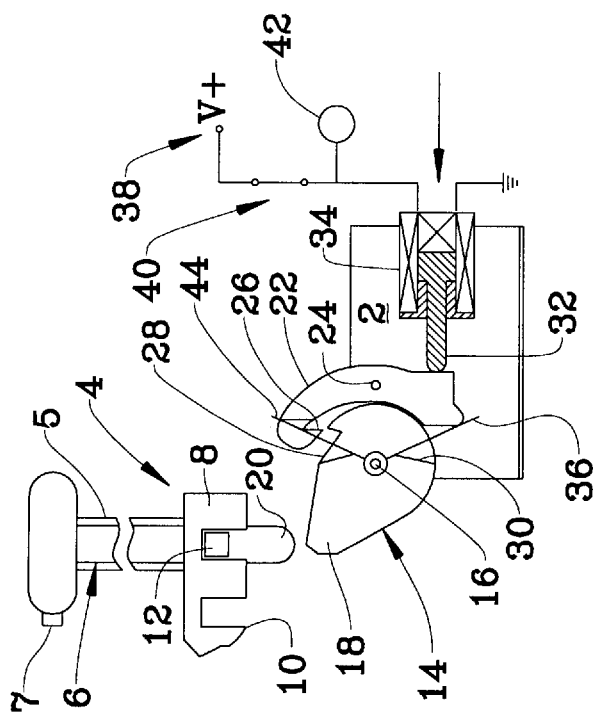
FIG. 2 shows the system of FIG. 1 with the brakes applied.

In FIG. 2, the driver has applied the brakes, which has caused switch 40 to close. The solenoid is now energized via the electric circuit, but no physical action has occurred because the plunger was already in the energized position against the bottom of the latch and the seal face.

Figure 3:
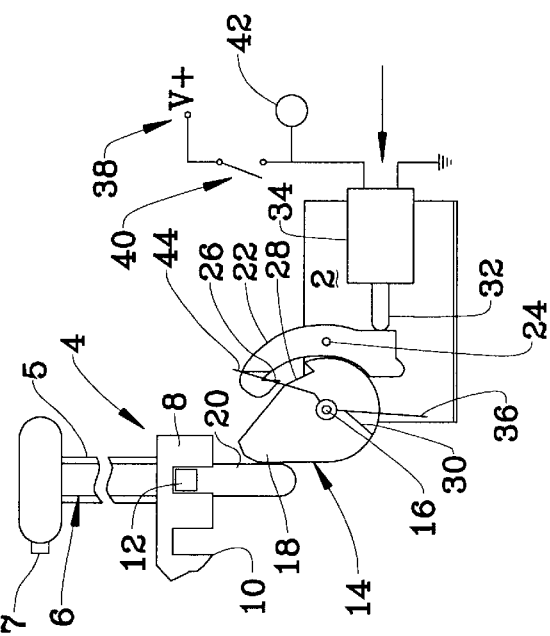
FIG. 3 shows the system of FIG. 1 with the brakes not applied and the transmission being shifted from park.

FIG. 3 illustrates the situation where the driver has attempted to move the shift lever from the park position by depressing the push rod 6 without applying the vehicle's brakes. Switch 40 is open, and the solenoid 34 is not energized. Engagement between the push rod end 20 and the lobe 18 has rotated the cam counterclockwise, and the bias spring 30 has rotated the latch into engagement with the cam. Is it noted that the bias spring in the solenoid applies a force to the latch that is smaller than that applied by the bias spring 30 whereby the bias spring 30 depresses the plunger 32 when the cam is rotated and the solenoid not energized. As shown in FIG. 1, the tooth 26 has engaged the notch 28, whereby the latch prevents further rotation of the cam. Thus, the transmission cannot be shifted out of park and is locked.

Figure 4:
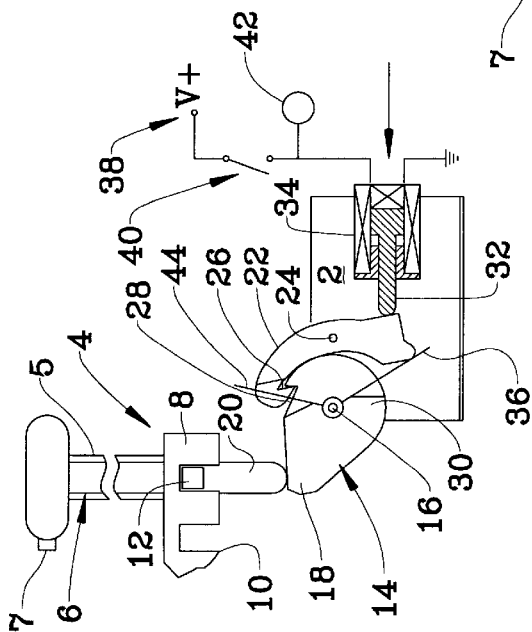
FIG. 4 shows the system of FIG. 1 with the brakes applied and the transmission being shifted from park.

FIG. 4 illustrates the situation where the operator has applied the brakes, and the switch 40 is closed. In this condition, the solenoid is energized, and the plunger 32 is held toward the left of the figures. This holds the latch out of engagement with the cam against the force applied by the bias spring 30. The cam is free to rotate counterclockwise because the latch is not engaged with the cam, and the push rod can move downward to disengage the bar 12 from the detent. The transmission may then be shifted from the park position.

Figure 5:
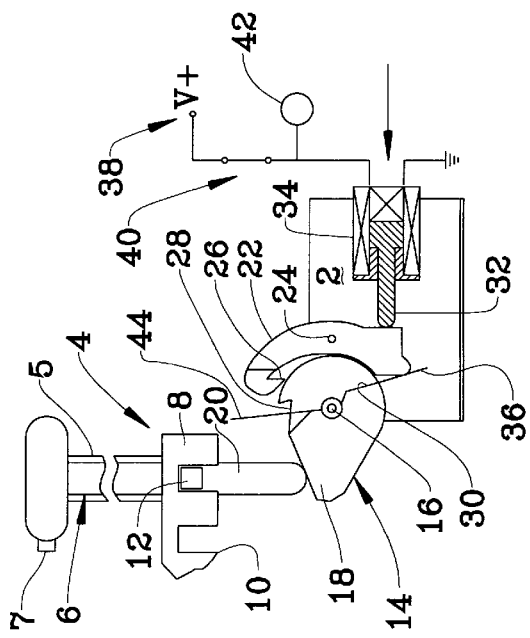
FIG. 5 shows the system of FIG. 1 with the brakes not applied and the transmission being shifted to the park position.

FIG. 5 illustrates the operation of the system when the transmission is shifted into park. During this operation, the push rod engages the cam lobe and rotates the cam clockwise. Because the interaction between the notch of the cam and the tooth of the latch only prevents rotation of the cam in the counterclockwise direction, the shift mechanism allows return of the shift lever to the park position whether or not the brakes are applied or the ignition is on. As shown in FIG. 5, the second leaf spring 44 engages the latch during clockwise rotation and returns the latch into the position shown in FIG. 1.

It will be appreciated that a unique interlock has been described. Modifications within the scope of the appended claims will be apparent to those of skill in the art.

I claim:

1. A transmission shift lever interlock comprising:
    a locking element, said locking element being movable between a locked position, wherein said locking element prevents movement of a shift lever out of a selected position, and an unlocked position, wherein said locking element allows movement of said shift lever out of said selected position,
    a latch adjacent said locking element, said latch being movable between an engaged position wherein said latch holds said locking element in said locked position and a disengaged position wherein said latch allows said locking element to assume said unlocked position, and a biased disengagement element positioned to bias said latch to said unlatched position when not energized, to allow said latch to move to said latched position when not energized, and to hold said latch in said unlatched position when energized.

2. A transmission shift lever interlock according to claim 1 wherein said disengagement element comprises a solenoid, an electric circuit, and a brake switch for operation by a brake element.

3. A transmission shift lever interlock according to claim 1 wherein said locking element comprises a pivotally-mounted element having a first portion for engaging said shift lever and a second portion for engaging said latch.

4. A transmission shift lever interlock according to claim 3 wherein said latch is pivotally mounted for pivotal movement between said latched and unlatched positions.

5. A transmission shift lever interlock according to claim 1 further comprising latch bias means for moving said latch from said unlatched position to said latched position in response to initiation of movement of said locking element from said locked position.

6. A transmission shift lever according to claim 5 wherein said latch bias means comprises a resilient element engaging said latch means.

7. A transmission shift lever interlock according to claim 6 wherein said locking element is a cam having a lobe for engaging said shift lever and a notch for engaging said latch.

8. A transmission shift lever interlock according to claim 6 wherein said resilient element is a leaf spring.

9. A transmission shift lever interlock according to claim 8 further comprising means for resiliently urging said latch toward said unlatched position upon movement of said locking element from said unlocked position to said locked position.

10. A transmission shift lever interlock comprising a locking element adapted to contact said shift lever and a latch, said locking element and latch being biased to an unlocked condition wherein said locking element is free to move in response to movement of said shift lever, a resilient element connected between said locking element and said latch such that movement of said locking element by said shift lever results in application of a force to said latch capable of placing said locking element and latch into a locked condition, and a control element arranged selectively to overcome said force to retain said locking element in the unlocked condition.

11. A transmission shift lever interlock comprising:

a cam mounted for pivotal movement between a first position where said cam engages a push rod to prevent movement of said push rod from a selected position and a second position where said cam allows movement of said push rod from said selected position, a latch mounted for pivotal movement between a latching position where said latch retains said cam in said first position and an unlatched position where said latch allows said cam to pivot to said second position, bias means for biasing said latch into engagement with said cam to retain said cam in said first position, and a solenoid for overcoming said bias means and for selectively positioning said latch out of engagement with said cam when activated.

12. A transmission shift lever interlock according to claim 11 further comprising an electric circuit for activating said solenoid when a brake pedal is depressed.

13. A transmission shift lever interlock according to claim 11 wherein said solenoid includes a plunger biased into engagement with said latch.

14. A transmission shift lever interlock comprising locking means for engaging a shift lever and preventing movement of said shift lever from a selected position when in said locked position, said locking means being movable between locked and unlocked positions, latch means having first and second positions for holding said locking means in said locked position when in said first position and allowing said locking means to move to said unlocked position when in said second position, latch bias means for applying a force capable of moving said latch means from said second position to said first position in response to initiation of movement of said locking means from said locked position as said shift lever begins to move from said selected position, and electric unlocking means for holding said latch means in said second position against said force applied by said latch bias means upon activation of an electric switch.

15. A transmission shift lever interlock according to claim 14 wherein said electric switch is operated by application of the brakes of a vehicle.

16. A transmission shift lever interlock according to claim 14 wherein said electric unlocking means comprises a solenoid having a plunger biased against said latch means to hold said latch means in said second position while allowing said plunger to be moved toward said first position when said solenoid is not energized.

17. A transmission shift lever interlock according to claim 14 wherein said latch means allows said locking means to permit movement of said shift lever to said selected position.

18. A transmission shift lever interlock according to claim 17 wherein said latch means comprises a pawl.

\* \* \* \* \*